(12) United States Patent
Weaver

(10) Patent No.: US 6,393,755 B1
(45) Date of Patent: May 28, 2002

(54) FISHING LURE

(76) Inventor: Brian Weaver, 573 Methodist Rd., Greenville, PA (US) 16125

( * ) Notice: Subject to any disclaimer, the term of this patent is extended or adjusted under 35 U.S.C. 154(b) by 0 days.

(21) Appl. No.: 09/640,059

(22) Filed: Aug. 17, 2000

(51) Int. Cl.[7] .............................................. A01K 85/00
(52) U.S. Cl. .................................... 43/42.03; 43/42.06
(58) Field of Search ........................... 43/42.06, 42.24, 43/42.03

(56) References Cited

U.S. PATENT DOCUMENTS

| | | | |
|---|---|---|---|
| 2,523,536 A | | 9/1950 | Maddux |
| 2,593,199 A | * | 4/1952 | Salg |
| 2,775,839 A | | 1/1957 | Kuslich |
| 2,794,287 A | * | 6/1957 | Mancusi, Jr. |
| 2,995,856 A | * | 8/1961 | Murawski |
| 3,162,971 A | | 12/1964 | Gilliam |
| 3,370,375 A | * | 2/1968 | Ottonello |
| 3,585,749 A | | 6/1971 | Dieckmann |
| 3,744,174 A | * | 7/1973 | Lund .......................... 43/42.06 |
| 3,973,350 A | * | 8/1976 | England ..................... 43/42.03 |
| 4,102,075 A | * | 7/1978 | Wagner et al. ............. 43/42.06 |
| 4,672,768 A | * | 6/1987 | Pippert ....................... 43/42.09 |
| 4,777,756 A | * | 10/1988 | Mattison .................... 43/42.06 |
| 5,167,088 A | | 12/1992 | Wardall |
| 5,276,992 A | | 1/1994 | Kato |

* cited by examiner

Primary Examiner—Thomas Price
(74) Attorney, Agent, or Firm—Harpman & Harpman

(57) ABSTRACT

A flexible life-like fishing lure having an opening in its main body member and/or appendages to impart movement to the lure. The openings deflect water as the lure is moved generating hydrodynamic pressure waves that help attract the fish.

12 Claims, 5 Drawing Sheets

FISHING LURE

BACKGROUND OF THE INVENTION

1. Technical Field

This invention relates to lures that are used to attract fish employed in fishing. Fishing lures of this type typically attempt to mimic live bait actions by having realistic movements, color and shapes. Many live action lures depend solely on the movement rather than the visual realisms to attract fish.

2. Description of Prior Art

Prior art devices of this type are directed to lures having water engagement surfaces that will cause the lure to move erratically as it is pulled through the water, see for example U.S. Pat. Nos. 2,523,536, 3,162,971 and 5,167,088.

In U.S. Pat. No. 2,523,536 a fishing lure is disclosed having a main body member with multiple heads extending therefrom. A large "head" portion is defined by a disk that is pivoted to the main body member.

U.S. Pat. No. 3,162,971 shows a sinking artificial lure having a body member with a large front plate portion and wing-like member extending from the rear thereof.

U.S. Pat. No. 5,167,088 is directed to an adjustable fishing lure activator which has a disk shaped activator of sheet plastic installed on the leader just in front of the lure's main body. The activator has a crease extending from a central opening defining an angled area.

Other prior art lures have a more naturalistic bait-like shape with water reacting structures; see for example U.S. Pat. Nos. 2,775,839, 3,585,749 and 5,276,992.

In U.S. Pat. No. 2,775,839 a fishing lure with an up/down motion is disclosed having a fish-like body with the deflector plates pivotally mounted on its front.

U.S. Pat. No. 3,585,749 is directed to a flexible fishing lure having a multi-chambered hollow body through which water passes as it is pulled through the water. The water volume is varied by a deflector valve opening so that water passes alternately from one chamber to the other imparting a realistic action to the lure.

U.S. Pat. No. 5,276,992 shows a lure having a hollow head portion through which water passes exiting through the gills thereby imparting motion to the lure by the effective water flow.

SUMMARY OF THE INVENTION

A fishing lure having a life-like shape with an opening transversely through its central body area and/or one or more of its appendages that will impart realistic movement to the lure as the water passes therethrough. A portion of the opening has a water deflecting concave shape to impart resistant energy to the lure body that is preferably of a flexible yielding synthetic resin material. As the water enters the opening it is displaced back against the inflow through the same opening, creating hydrodynamic pressure waves that radiate outwardly from the lure into the surrounding water.

DESCRIPTION OF THE PREFERRED EMBODIMENT

Figure 1:
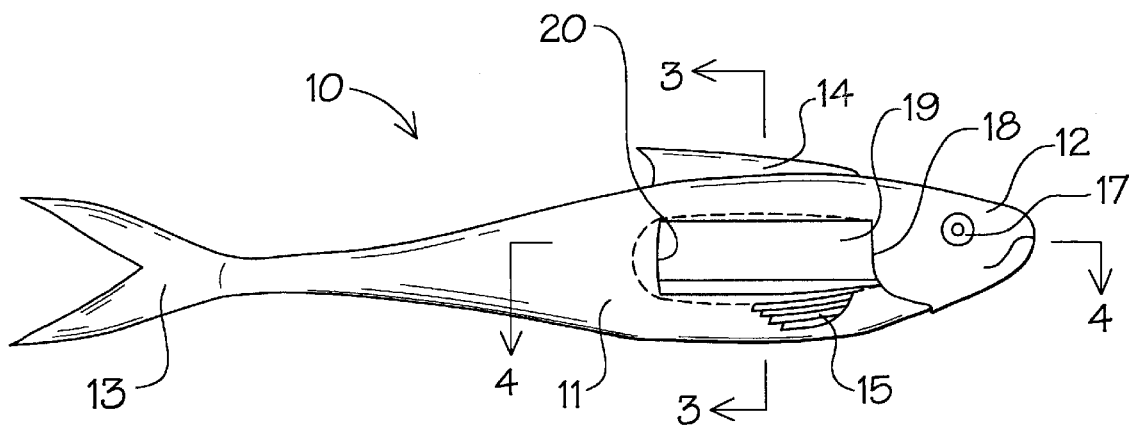
FIG. 1 is a side elevational view of a lure of the invention.
Figure 2:
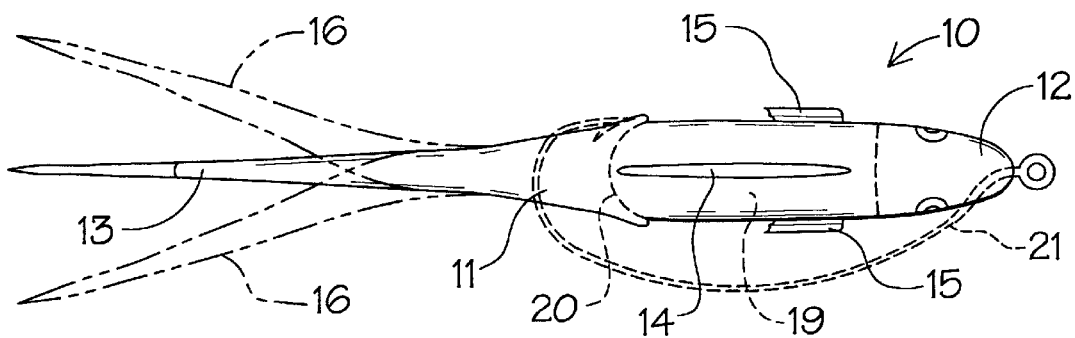
FIG. 2 is a top plan view of the lure as seen in FIG. 1.
Figure 3:
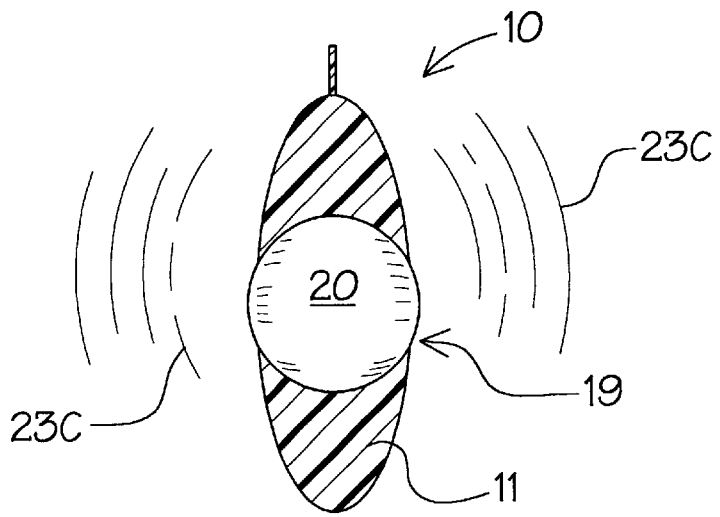
FIG. 3 is a cross-sectional on lines 3—3 of FIG. 1.

Referring to FIGS. 1–4 of the drawings, a fishing lure 10 of the invention can be seen having a main body 11 configured to resemble a bait fish. The main body 11 has a head portion 12, a tail portion 13 and in this example chosen for illustration an upper dorsal fin 14 and oppositely disposed fin representation 15. The head portion 12 has a pair of eye representations 17 with gill ridges 18 in spaced relation to the respective eye representation 17. The main body 11 has a centrally located opening at 19 that extends longitudinally from the gill ridges 18 to a point midway of the overall length of the main body member 11. The opening at 19 extends transversely through the main body member 11 and is of a height equal to that of approximately one-half the total vertical section of the main body member 11 as best seen in FIG. 3 of the drawings. The opening 19 has a contoured end wall 20 that defines a concave engagement surface as is best illustrated and seen in FIG. 4 of the drawings.

Figure 4:
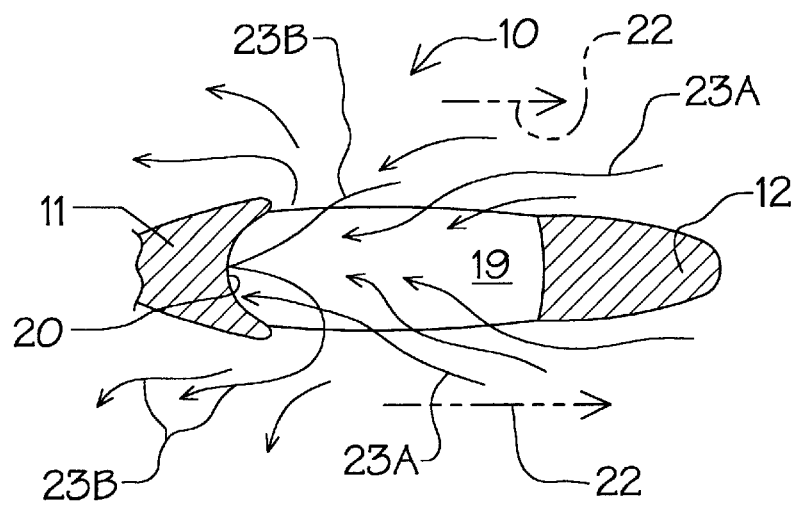
FIG. 4 is a partial cross-sectional view on lines 4—4 of FIG. 1.

In use, as the lure 10 of the invention is pulled through the water in a forward direction as indicated by broken directional arrows 22, the flow dynamics of the water are illustrated in FIG. 4 of the drawings by flow arrows 23A and 23B. The initial flow characteristics of the water into the opening at 19 are illustrated by the flow arrows 23A in which equal flow direction pass around the head portion 12 and into the opening at 19. The flow direction is disrupted and divided by impingement with the contoured end wall 20 indicated by the flow arrows 23B. The disruption of the flow direction by the contoured surface of the end wall 20 sets up a counter-flow that forms pressure ridges extending from the concaved end wall surface 20 forward within and extending from the opening at 19 as illustrated by the pressure wave indication lines 23C. Since the main body member 11 of the lure 10 is preferably molded of resilient flexible synthetic resin material, the lure 10 will be randomly displaced in both the horizontal and vertical axis as it is pulled through the water imparting a life-like motion to the lure 10 as shown in broken lines at 16. The hook placement for the lure 10 is shown in FIG. 2 with dotted lines at 21.

The pressure waves indicated by pressure wave lines 23C radiate outwardly from the main body 11 can be sensed by game fish making the lure 10 both visually and sensory attractive, thus increasing the efficiency of the lure and the likelihood of a strike.

Figure 5:
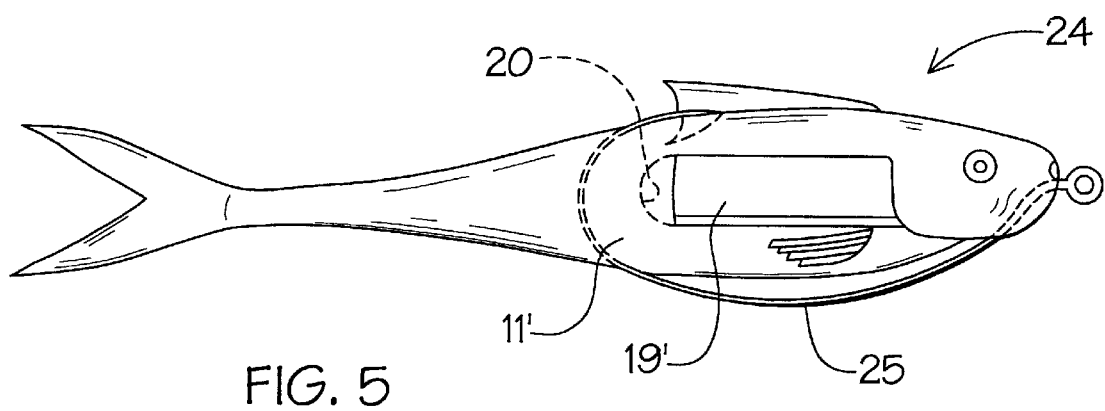
FIG. 5 is a side elevational view of the lure with a hook embedded within.

Referring now to FIG. 5 of the drawings, a lure 24 can be seen having a hook 25 embedded partially within the main body member 11' around the opening at 19'. The opening at 19' has the contoured curved end wall surface 20. It will be noted that the transverse dimension of the openings at 19 and 19' would vary in accordance with the dimensional characteristics of the lures 10 and 24 being in these examples narrower adjacent the head portion 12 than that of the trans-dimension of the concave surfaces 20 and 20' which assist in the formation characteristics of the pressure wave indicated by the pressure wave arrows 23C as hereinbefore described.

Figure 6:
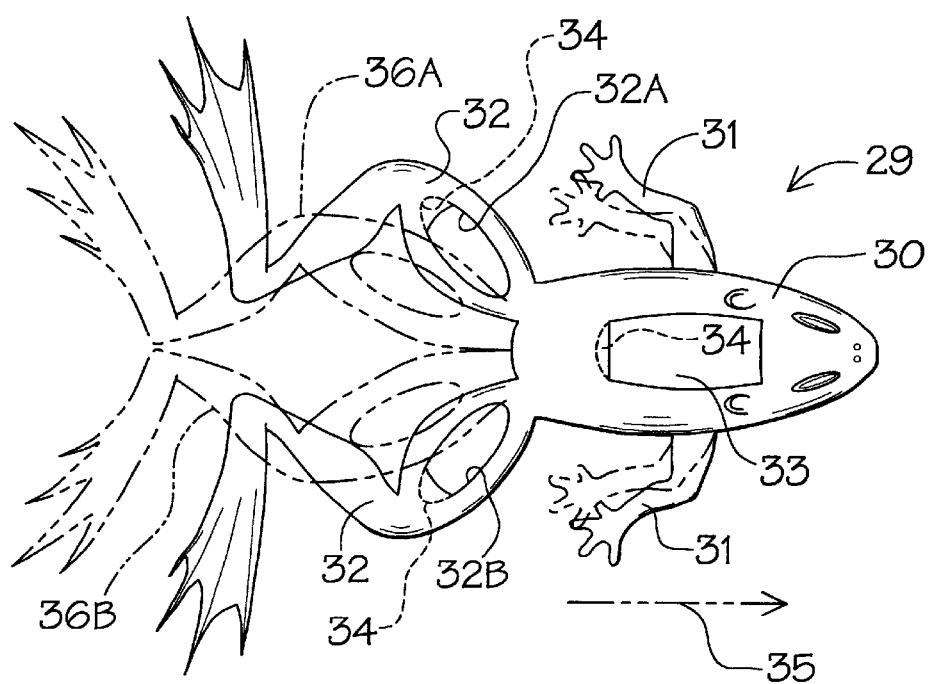
FIG. 6 is a top plan view of an alternate form of the invention illustrating an amphibious configuration.
Figure 7:
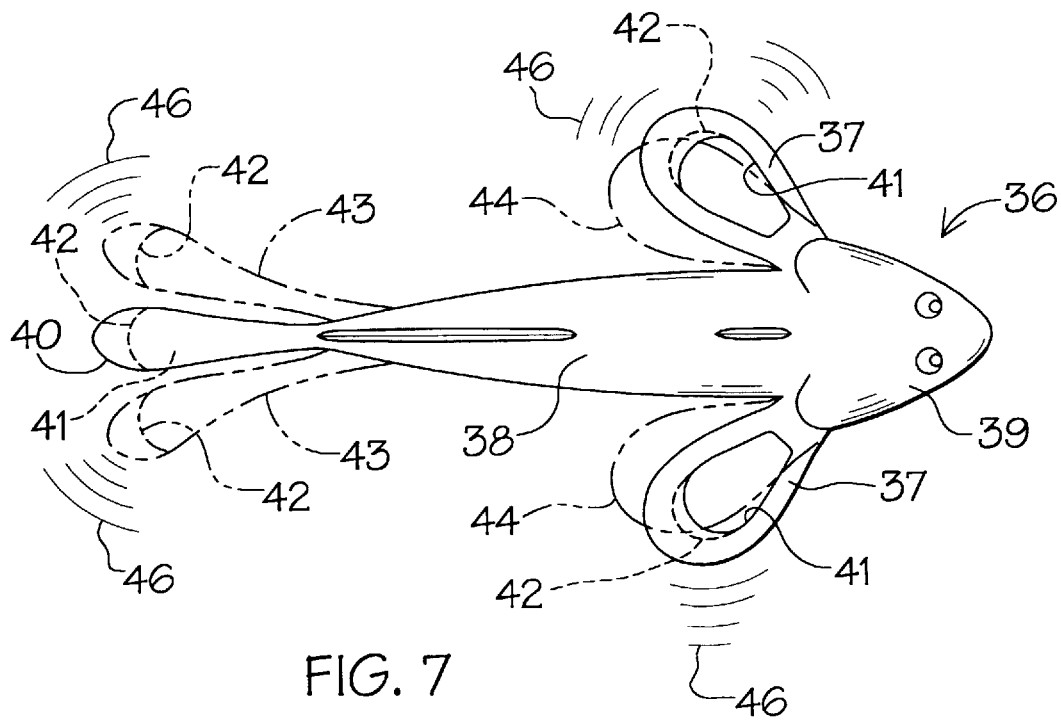
FIG. 7 is a top plan view of a second alternate form of the invention.
Figure 8:
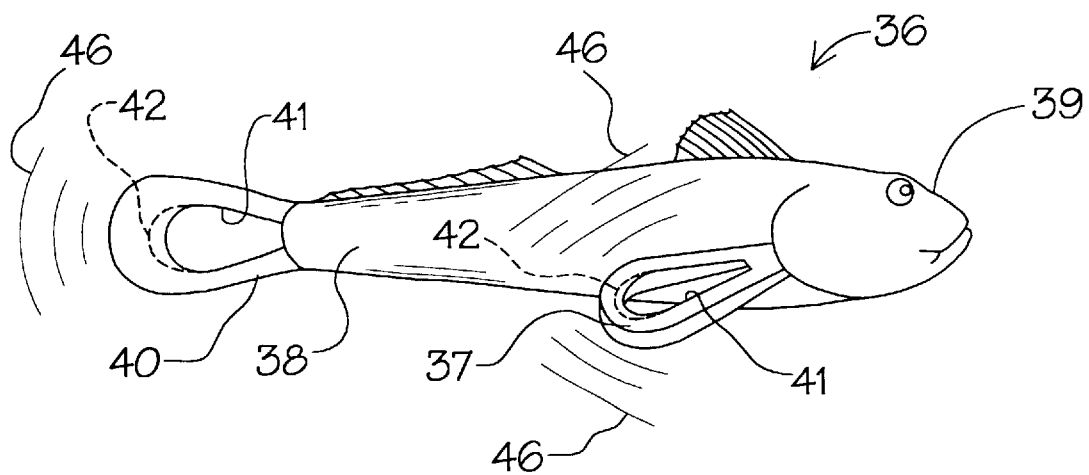
FIG. 8 is a side elevational view of the lure illustrated in FIG. 7.

Referring now to FIGS. 6, 7 and 8 of the drawings, alternate lure configurations can be seen. In FIG. 6 of the drawings, an amphibian frog representation 29 can be seen having a body 30, arm extensions 31 and a pair of legs 32. The body 30 has an opening 33 with a concave surface engagement area 34 within. Each of the legs 32 have respective openings at 32A and 32B which have the same concave surface engagement configuration area 34 within as hereinbefore described.

In use, when the frog representation 29 is intermittently pulled forward through the water as indicated by directional arrow 35, the legs 32 will be drawn back (elongated) and together as illustrated in broken lines at 36A and 36B. Correspondingly, once the forward motion is ceased, the legs 32 will return to their original position relative to the body member 30.

In FIGS. 7 and 8 of the drawings, a second alternate form of the invention can be seen wherein a fish representation 36 is illustrated having enlarged oppositely disposed fin elements 37 extending from a body 38 with head and tail portions 39 and 40 respectively thereon. Contoured openings at 41 within the respective fins 37 and tail portion 40 have a modified concave surface engagement areas at 42.

In use, the aquatic representation 36 will act in a life-like manner with movement of the tail 40 and fins 37 illustrated in broken lines at 43 and 44 respectively.

Due to the water flow through the respective contoured openings at 41 and impingement with the respective concave surface engagement areas 42, pressure wave gradients indicated by lines 46 will be achieved.

Figure 9:
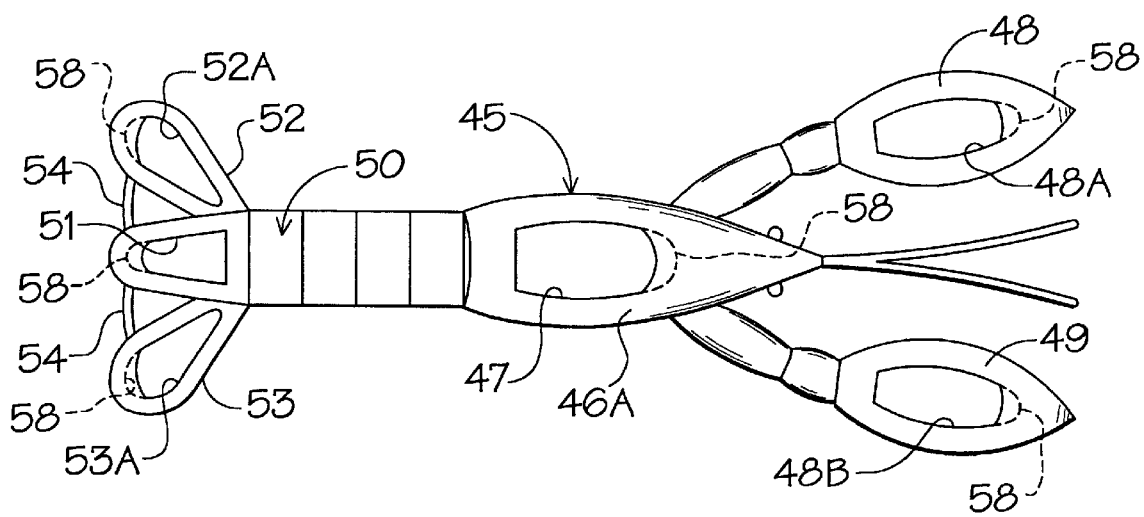
FIG. 9 is a top plan view of a third alternate form of the invention.
Figure 10:
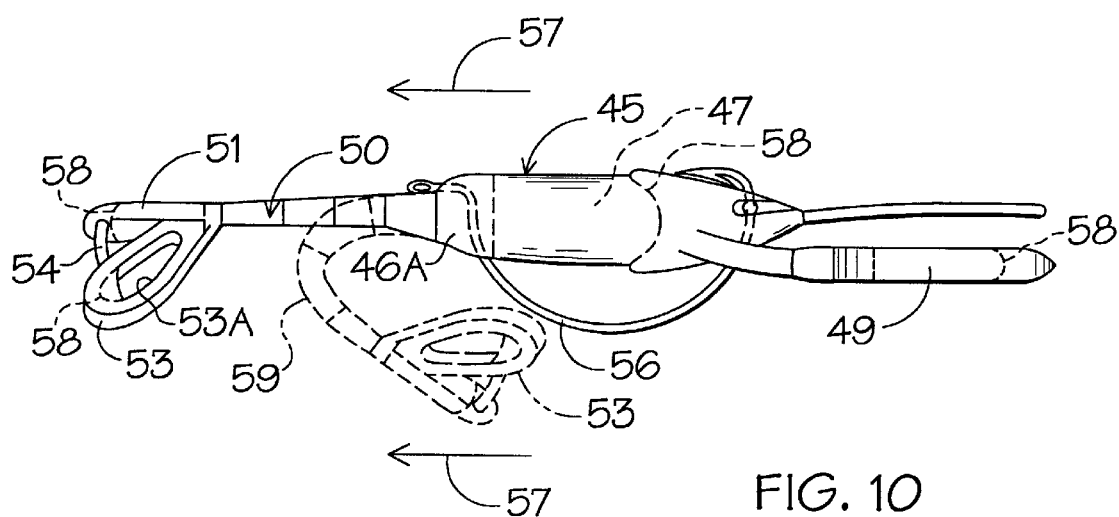
FIG. 10 is a side elevational view of the lure set forth in FIG. 9.

Referring to FIGS. 9 and 10 of the drawings, a third alternate form of the invention can be seen wherein a crayfish 45 representation is shown having a main body member 46A with a contoured opening at 47 of the invention therein. Claws 48 and 49 extend from the body 46A each of which has a contoured opening at 48A and 48B respectively.

A tail portion 50 extends from the body 46A having a contoured opening therein at 51 and a pair of tail fins 52 and 53 extend therefrom. The tail fins 52 and 53 have respective contoured openings therein at 52A and 53A and respective connection bands 54 that extend to the distal end of the tail portion 50. All of the contoured openings, 47, 48A, 48B, 52A, 53A and 51 have respective fluid engagement surfaces 58 that are the same as the contoured surface end wall 20 as hereinbefore described that sets up a counter flow to form pressure ridges in the water and to impart resilient movement to the body during use.

Referring now to FIG. 10 of the drawings, the crayfish 45 representation can be seen with a hook 56 embedded partially within so that the crayfish 45 representation can be pulled through the water in a backwards direction indicated by directional arrows 57 when attached to a fishing line, not shown, as understood within the art. Given the resilient nature of the material of which the crayfish 45 representation is formed, the tail portion 50 will deflect as indicated in broken lines at 59 and position the fins 52 and 53 for flow pattern engagement imparting lifelike action to the tail.

The claws 48 and 49 also will respond to water flow through the contoured openings 48A and 48B with the fluid engagement surfaces 58 imparting movement thereto as hereinbefore described.

It will be evident that other lure configuration representations of bait or aquatic animals can be used in which the openings 19, 32A, 41, 48A and 51 as hereinbefore described will impart the same realistic movements thereto as well as setting up the unique pressure waves and its associated wave gradients emanating from the lure thus attracting the game fish by both visual and sensory perception thus enticing the game fish to be interested and attracted to such lures.

It will be apparent to those skilled in the art that various changes and modifications may be made therein without departing from the spirit of the invention.

Therefore I claim:

1. A fishing lure comprising, in combination, a flexible elongated body portion having a head portion and a tail portion, said main body portion having an enlarged opening extending transversely therethrough, a contoured end wall in said opening downstream of said head portion defines a concave transversely extending surface, water displacement associated with said elongated opening whereby water is forced into and through said opening engaging with said concave transverse surface of said contoured end wall causing a reactive pressure wave as the lure is dragged through water and imparting alternating deflection of the tail and main body portion of said lure.

2. The fishing lure set forth in claim 1 wherein said water engaging concave surface on said end wall extends inwardly in to said tail portion.

3. The fishing lure set forth in claim 1 wherein said concave surface on said end wall extending transversely across said main body member within said elongated opening is in spaced relation to said head portion.

4. The fishing lure set forth in claim 1 wherein said reactive pressure wave in the water extends outwardly from and beyond said elongated opening.

5. The fishing lure set forth in claim 1 wherein said lure is preferably molded from flexible synthetic resin material.

6. The fishing lure set forth in claim 1 wherein said fishing lure has a hook means extending through said head portion around said elongated opening and through said tail portion.

7. A fishing lure comprising in combination a flexible elongated body portion simulating an aquatic representation, said body portion having multiple appendages simulating legs extending therefrom, an elongated reactive opening in some of said respective appendages and said body portion, a concaved end wall surface within said elongated reactive openings whereby water is displaced after entering said openings imparting movement to said appendages in multiple positions as the lure is intermittently drawn through water and means for pulling said lure through the water.

8. The fishing lure set forth in claim 7 wherein said concaved end wall surface forces water outwardly from said elongated opening creating pressure waves in the water.

9. The fishing lure set forth in claim 7 wherein said flexible elongated body portion is molded from synthetic resin material.

10. The fishing lure set forth in claim 7 wherein a tail portion extends from said body portion, said tail portion having multiple fins with said elongated reactive openings therein.

11. The fishing lure set forth in claim 10 wherein said multiple fins have an interconnecting attachment bands extending therefrom to the distal end of said tail portion.

12. The fishing lure set forth in claim 7 wherein said means for pulling said lure through the water comprises, a hook positioned through the elongated body portion with portions of said hook extending outwardly therefrom.

* * * * *